June 5, 1923.
E. R. MILLER
SAFETY DEVICE FOR TRACTORS
Filed July 31, 1920
1,457,712
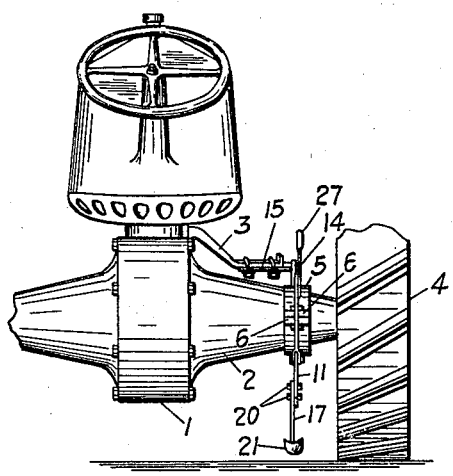
Fig. 1
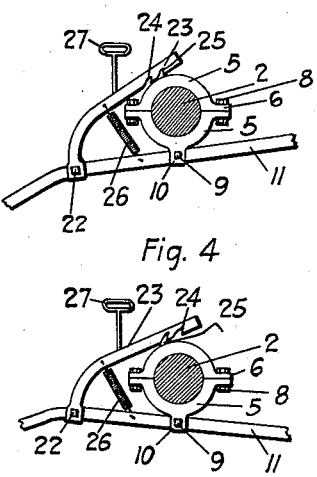
Fig. 4
Fig. 5
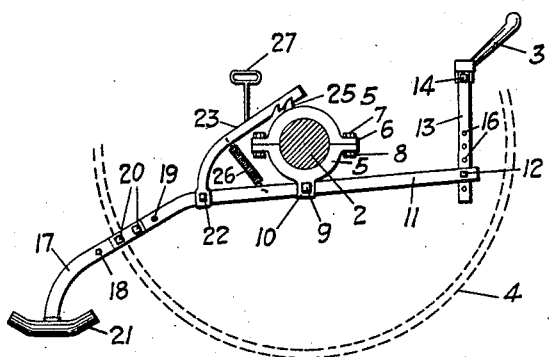
Fig. 2
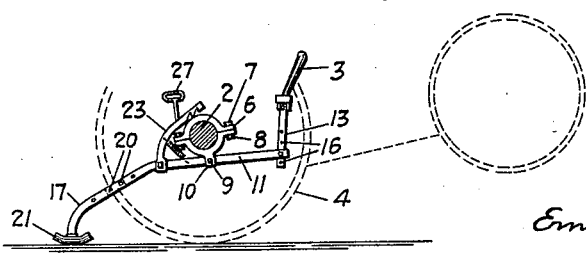
Fig. 3
INVENTOR,
Ernest R. Miller,
BY Howard S. Smith,
ATTORNEY Patented June 5, 1923.

1,457,712

UNITED STATES PATENT OFFICE.

ERNEST R. MILLER, OF MONTGOMERY COUNTY, NEAR CENTERVILLE, OHIO.

SAFETY DEVICE FOR TRACTORS.

Application filed July 31, 1920. Serial No. 400,436.

*To all whom it may concern:*

Be it known that I, ERNEST R. MILLER, a citizen of the United States, residing in the county of Montgomery, near the town of Centerville, State of Ohio, have invented certain new and useful Improvements in Safety Devices for Tractors, of which the following is a specification.

It is the principal object of my invention to provide for light tractors, a safety device to prevent them from turning over backwards when the traction wheels become mired or are otherwise stopped when the engine is running and the clutch is engaged. Many drivers have lost their lives, and others have been seriously injured, by tractors turning over upon them, due to the fact that the front end of the machine has not been heavy enough to hold it down when the rear traction wheels, still connected by the clutch with the running engine, have stopped. The result has been that the small bevel gear on the driving shaft would travel around the locked bevel gear that turns the differential mechanism, and lift the front end of the machine, which was not heavy enough to oppose the power of the engine.

It is the principal object of my invention, therefore, so soon as the tractor starts to turn over, to automatically release the clutch, which at once severs the connection between the running engine and the differential mechanism. My safety device is easily attachable to a tractor, it is simple in construction, and it may be depended upon to release the clutch before the tractor can turn over upon the operator. It will not only throw the clutch out automatically, but it will hold it out until it is again desired to start the machine.

In the accompanying drawings, Figure 1 is a rear view of a tractor equipped with my improved safety device. Figure 2 is a side view of said device operatively connected to the clutch pedal of a tractor, showing the shoe on the engaging lever above the ground. Figure 3 is a side view of said device, showing how the latter pulls the clutch pedal down to release the clutch when the tractor starts to turn over backwards. Figure 4 is a side view of the means for holding the clutch in its released position. And Figure 5 is a side view of said means when the clutch is being held out by it.

Throughout the specification and drawings, similar reference characters denote corresponding parts.

Referring to the accompanying drawings, the numeral 1 designates a light tractor and 2 the rear axle section thereof below the clutch pedal 3. Adapted to be applied to the rear axle section 2 near the rear traction wheel 4 are two clamping members 5, 5 whose inner peripheries are semi-circular. These members have horizontal bosses 6 adapted to receive bolts 7 to which nuts 8 are applied to firmly secure said members to the axle.

Pivotally secured by a bolt 9 between a pair of downwardly projecting bosses 10, 10 on the lower clamping member 5, is a lever 11 whose front end is adapted to be secured by a bolt 12 to a vertical member 13 that pivotally receives at its upper end the reduced portion 14 of a horizontal member 15 that is firmly clamped to the clutch pedal 3. (See Figures 1, 2 and 3.) For the purpose of adjusting the throw of the clutch pedal 3 by the lever 11, the vertical member 13 is provided with a series of holes 16 through any one of which the bolt 12 is adapted to be passed to firmly secure said lever 11 to the vertical member 13. (See Figure 2.)

At its rear end the lever 11 inclines downwardly to receive the upper end of an inclined section 17 which contains a series of holes 18 adapted to register with holes 19 provided in the rear end of the lever, whereby said section may be adjustably secured to the latter by bolts 20. Secured to the lower end of the lever section 17 is a horizontal shoe 21 with upwardly inclined ends to ride over growing plants without injuring the latter.

Should the tractor start to turn over backwards for the reasons heretofore given, the shoe 21 will engage the ground when the front section of the machine, shown in dotted lines in Figure 3, begins to turn around the rear axle as a pivot. So soon as the shoe 21 engages the ground, a further turning movement of the machine will cause the front end of the lever 11 to pull down the clutch pedal 3 a sufficient distance to throw out the clutch and thereby sever the connection between the running engine and the differential mechanism before the tractor has turned far enough to turn over upon the driver.

For the purpose of automatically holding the clutch out until it is again desired to start the tractor, or for belt work, the following means are provided. Referring to Figures 4 and 5, there is pivotally secured to the rear end of the lever 11, by a bolt 22, a curved arm 23 that contains in the bottom edge of its free end notches 24. Projecting upwardly from the top clamping member 5 is a tooth 25 adapted to enter either one of the notches 24 in the curved arm 23. When the rear end of the lever 11 is elevated through the engagement of the shoe 21 with the ground, the arm 23 will be pushed forwardly and upwardly by the rear end of the lever to bring its rear notch 24 over the tooth 25, whereupon, when the clutch is released, a spring 26, connected between said arm and the lever, will pull the former downwardly to bring the tooth within the notch to lock the lever in its adjusted position and thereby prevent the engagement of the clutch until the arm is disengaged from the tooth. For conveniently doing this, a handle 27 is secured to the arm 23 by which it may be easily raised by the driver.

I do not wish to be limited to the details of construction and arrangement herein shown and described, and any changes or modifications may be made therein within the scope of the subjoined claims.

Having described my invention, I claim:

1. In a device of the type described, the combination with the clutch pedal of a tractor, of a lever operatively secured at one end to said clutch pedal, fulcruming means for said lever, attachable to the tractor, whereby, when the latter starts to turn over backwards, the free end of said lever may engage the ground to pull down upon said clutch pedal to release the clutch, a lug on said fulcruming means, an arm pivotally secured to the free end of said lever, and teeth on the free end of said arm adapted to engage said lug, when the free end of said lever is elevated, to hold the clutch pedal in its clutch-releasing position.

2. In a device of the type described, the combination with the clutch pedal of a tractor, of a lever operatively secured at one end to said clutch pedal, fulcruming means for said lever, attachable to the tractor, a lug on said fulcruming means, an arm pivotally secured to the free end of said lever, and teeth on the free end of said arm adapted to engage said lug, when the free end of said lever is elevated, to hold the clutch pedal in its clutch-releasing position.

In testimony whereof I have hereunto set my hand this 29th day of July, 1920.

ERNEST R. MILLER.

Witness:
HOWARD S. SMITH.